United States Patent Office 3,813,437
Patented May 28, 1974

---

3,813,437
N-2-ETHYLHEXYL-N'-ARYL UREAS
Dieter Duerr, Bottmingen, Hans Rudolf Hitz, Muttenz, Max Duennenberger, Frenkendorf, and Max Schellenbaum, Muttenz, Switzerland, assignors to Ciba-Geigy AG, Basel, Switzerland
No Drawing. Continuation-in-part of application Ser. No. 7,425, Jan. 12, 1970, which is a division of application Ser. No. 694,121, Dec. 28, 1967, now Patent No. 3,592,932. This application July 7, 1972, Ser. No. 269,686
Claims priority, application Switzerland, Oct. 17, 1967, 14,462/67
Int. Cl. C07c *127/16*
U.S. Cl. 260—553 A  3 Claims

---

ABSTRACT OF THE DISCLOSURE

The present invention provides N-2-ethylhexyl-N'-arylureas which are useful as active ingredients in preparations for combating harmful bacteria.

---

CROSS-REFERENCE TO RELATED APPLICATIONS

This is a continuation-in-part of application Ser. No. 7,425, filed Jan. 12, 1970, now abandoned, which in turn is a division of application Ser. No. 694,121, filed Dec. 28, 1967, now U.S. Pat. No. 3,592,932.

The present invention provides preparations for combating harmful bacteria, containing as active ingredient a 2-ethylhexyl-1-ureas of the formula (1) 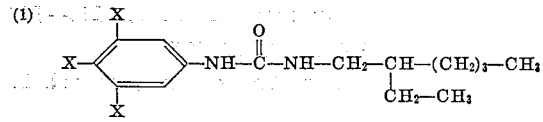

wherein X represents hydrogen, halogen or trifluoromethyl with the proviso that at least one but not more than two X substituents are trifluoromethyl radicals.

Of special value are the 2-ethylhexyl-1-ureas of the formula (2) 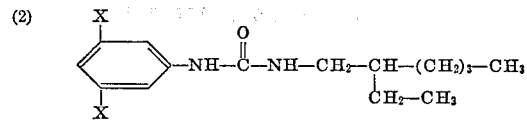

wherein X has the meaning given above.

The N - 3,5 - bis - trifluoromethylphenyl-N'-2-ethylhexyl-1-urea of the formula (3) 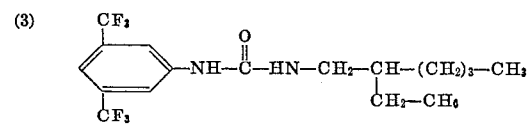

has proved to be particularly potent.

The compounds of the formula (1) are obtained by reacting an isocyanate of the formula (4) 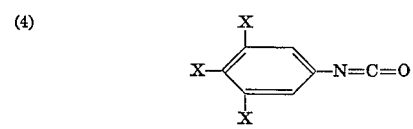

wherein X has the meaning defined above, with 2-ethylhexyl-1-amine.

Preparations for combating harmful bacteria containing a 2-ethylhexyl-1-urea of the formula (1) may be prepared and used in the known manner. A particularly valuable feature of the new preparations is their broad antibacterial activity spectrum, including both Gram-positive and Gram-negative bacteria. Insofar as the aplication of the new compounds of the formula (1) is concerned the absence of odors and colors in them is of special value. Thus, the present invention includes also their use in bacterial control quite generally. They may be used on a very broad basis, especially for protecting organic substrates from infestation by destructive and pathogenic bacteria. The compound of the formula (1) are, accordingly, suitable for use as preservatives and disinfectants for textile materials and technical products of all description, in veterinary medicine and in cosmetics.

From among industrial products that can be preserved with the aid of compounds of formula (1) there may be mentioned as random examples: textile dressing and improving agents, glues, binders, paints, dyeing and printing pastes and similar preparations based on organic or inorganic dye-stuffs or pigments, including these which incorporate casein or other organic compounds. Wall and ceiling paints, for example those containing a proteinic dyestuff binder, are likewise protected by an addition of the now compounds from infestation by bacteria.

Furthermore, the compounds of the formula (1) may be used for preserving and disinfecting dressings on fibres and textile materials; they may be applied both to natural and synthetic fibres and produce on them a durable effect against harmful (including pathogenic) bacteria. The addition may be made before during or after a treatment of the said textile materials with other substances, for example dyeing or printing pastes, dressings or the like.

Textile materials treated in this manner are also protected from the appearance of body odour (perspiration) caused by bacteria.

Compound of the formula (1) may also be used as preservatives in the cellulose and paper industries, *inter alia* for preventing the known slime formation caused by bacteria in paper-making machines.

Furthermore, by combining compounds of the formula (1) with detergent or surface-active substances there are obtained washing and cleansing preparations having an excellent antibacterial effect. These ureas may be incorporated, for example, with soaps or combined with soap-free detergent and surface-active substances or with mixtures of soaps and soap-free detergents, and in such combinations their antibacterial activity is fully retained.

Cleansing agents containing compounds of the formula (1) may be used in industry or in the home, also in the food industry, for example in dairies, breweries and abattoirs. The compounds of the formula (1) may also be used as ingredients of preparations used for cleansing and disinfecting.

Their activity may also be utilized in preserving and disinfecting dressings on plastics. When plasticizers are used it is advantageous to add the compound of the formula (1) to the plastic material in the form of a solution or dispersion in the plasticizer. It is advantageous to ensure that the compound is distributed as evenly as possible in the plastic. Plastics having antibacterial properties may be for making utilitarian articles of a wide variety which are desired to have an antibacterial activity, for example in doormats, bathroom curtains, seats, treads in swimming baths and wall coverings. By incorporating them with wax and polishing compositions there are obtained floor and furniture polishes having a disinfecting activity.

The compounds of the formula (1) may be applied to the textile materials to be protected in various ways, for example by impregnation or spraying with solutions or suspensions containing the said compounds as active ingredient. The content of active substance may range, according to the intended use, from 1 to 30 g. of active substance per litre of treatment liquor. In most cases textile materials of synthetic or natural origin are sufficiently protected from bacterial infestation by a content of 0.1 to 3% of active substance. The active substance may be used in combination with other textile dressings such as finishes, anticrease dressings or the like.

The forms of application may be similar to the usual formulations of pest control agents, for example preparations containing compounds of the formula (1) may also contain additives such as vehicles, solvents, diluents, dispersants, wetting agents, adhesives and the like, and also other pest control agents, for example fungicidal or fungistatic substances.

Unless otherwise indicated, parts and percentages in the following Examples are by weight.

EXAMPLE 1

258 g. of 3,5 - bis-trifluoromethylphenylisocyanate are added at a temperature of 15° C. to a solution of 510 g. of 2-ethylhexyl-(1)-amine in 1500 ml. methylenechloride. The N - 3,5-bis-trifluormethylphenyl-N'-2-ethylhexyl-(1)-urea thus formed is extracted with 1 N HCl and the resultant aqueous solution is evaporated. The solid residue is recrystallized in aqueous methanol. The yield is about 87% (=Compound B). Calculated: C 53, 12%; H 5, 77%; N 7, 29%. Found: C 53, 20%; H 5, 98%; N 7, 34%.

In an analogous manner the following compounds may be prepared:

TABLE I

| Compound | X in Formula (1) | Melting at ° C. |
|---|---|---|
| A | Cl—⟨phenyl⟩—, F₃C | Boiling at 100–105/0.15 mm. Hg. |
| B | F₃C—⟨phenyl⟩—, F₃C | 72 to 73. |
| C | ⟨phenyl⟩—, F₃C | 34 to 36. |

EXAMPLE 2

Antibacterial activity in the dilution test

A solution of 1% and 0.3% strength each of the active substance in dimethylsulphoxide are introduced into small tubes containing sterile brain heart infusion broth and with these solutions dilution series are prepared in which each member is one tenth the strength of the preceding member. By combining the two series the following continuous dilution series is obtained:

1000, 300, 100, 30, 3 parts per million and so forth.

The solutions are inoculated with the bacterium *Staphylococcus aureus* and then incubated for 48 hours at 37° C. (bacteriostatic test).

After 24 hours' cultivation an earful of the solutions from the tubes is smeared over glucose agar plates and incubated for 24 hours at 37° C. (bactericidal test).

After the times mentioned the minimal inhibitory concentration in parts per million shown in Table II is found.

TABLE II

| Compound | Minimal inhibitory concentration in parts per million | |
|---|---|---|
| | Bacteriostatic test | Bactericidal test |
| A | 1 | 1 |
| B | 0.6 | 1 |

EXAMPLE 3

The effect on the growth of bacteria of the following substances has been tested:

(I) N - 3,5 - bis - trifluoromethylphenyl - N' - ethylhexyl-urea (according to the present invention=compound B).

(II) N - n - octyl - N' - 3,4 - dichlorophenyl urea (known from J. Med. Chem. 9, 426–428; (1966).

(III) N - 1,1,3,3 - tetramethylbutyl - N'-3,4-dichlorophenyl urea (known from J. Med. Chem. 9, 426–428; 1966).

Methods (A) A 0.01 ml. aliquot of a 1.0% by weight solution of the respective test substances I, II and III in dimethyl sulfoxide is mixed up with 10 ml. of warm AC-agar (Difco) containing 5% by weight of bovine serum albumine. The warm mixture are poured into Petri-dishes where they are allowed to harden. Then the surface of the plates is inoculated with streaks of a suspension of *Staphylococcus aureus* SG 511. The thus inoculated plates are incubated for 24 hours at 37° C.

(B) A 0.2 ml. aliquot of a 0.01% by weight solution of the respective test substances I, II and III in dimethyl sulfoxide is mixed up with 10 ml. of warm liquified AC-agar (Difco) containing 5% by weight skim milk (Difco). These warm mixtures are poured into Petri-dishes, where they are allowed to harden. Then the surface of the plates is inoculated with streaks of a suspension of *Staphylococcus aureus* SG 511. The thus inoculated plates are incubated for 24 hours at 37° C.

Results

After the given time of incubation in both the experiments (A) and (B) no growth of *Staphylococcus aureus* SG 511 could be detected in the Petri-dishes containing compound I. In contrast thereto the surfaces of the plates containing the compounds II and III respectively are completely covered with growth of *Staphylococcus aureus*.

Conclusion

From the above results it can be seen, that compound I according to the instant invention shows a strong bactericidal effect in protein containing substrates, whereas the substances II and III known from J. Med. Chem. 9 (3), 426–428 (1966) are not able to inhibit or to prevent bacterial growth under the said conditions.

EXAMPLE 4

To manufacture an antibacterial soap in cake form 1.2 g. of N - 3,5 - bis - trifluoromethylphenyl-N'-2-ethyl-1-urea are added to a mixture of:

120 g. of basic soap in flake form
0.12 g. of the disodium salt of ethylenediamino-tetraacetic acid [dihydrate]
0.24 g. of titanium dioxide.

The soap chips formed by rolling are powdered in a high-speed stirrer and then compressed in cake form. The soaps show excellent bacteriostatic and bactericidal effectiveness.

What is claimed is:

1. The compound of the formula

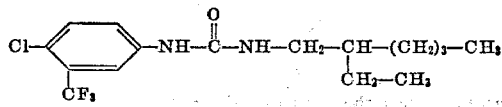

2. The compound of the formula

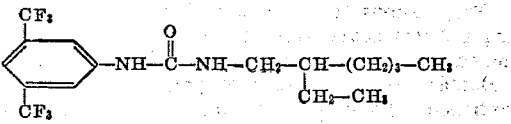

3. The compound of the formula
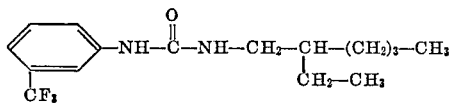
References Cited
UNITED STATES PATENTS
3,592,932  7/1971  Duerr et al. ____ 260—553 A(X)
OTHER REFERENCES
Duerr et al. Chemical Abstracts, vol. 70, col. 106177Y (1969).
Duerr et al. South African Patent Journal, page 214 (June 1968).
LEON ZITVER, Primary Examiner
M. W. GLYNN, Assistant Examiner